(12) United States Patent
Royer, Jr.

(10) Patent No.: US 9,317,421 B2
(45) Date of Patent: Apr. 19, 2016

(54) MEMORY MANAGEMENT

(71) Applicant: Intel Corporation, Santa Clara, CA (US)

(72) Inventor: Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/039,129

(22) Filed: Sep. 27, 2013

(65) Prior Publication Data

US 2015/0095563 A1    Apr. 2, 2015

(51) Int. Cl.
*G06F 12/00* (2006.01)
*G06F 12/02* (2006.01)
*G06F 3/06* (2006.01)

(52) U.S. Cl.
CPC .............. *G06F 12/0238* (2013.01); *G06F 3/06* (2013.01); *G06F 2212/202* (2013.01); *G06F 2212/7201* (2013.01); *G06F 2212/7204* (2013.01)

(58) Field of Classification Search
None
See application file for complete search history.

(56) References Cited

U.S. PATENT DOCUMENTS

| | | | |
|---|---|---|---|
| 2009/0150599 A1 | 6/2009 | Bennett | |
| 2009/0171650 A1 | 7/2009 | Norman | |
| 2009/0313416 A1 | 12/2009 | Nation | |
| 2012/0239860 A1 | 9/2012 | Atkisson et al. | |
| 2013/0262405 A1* | 10/2013 | Kadatch et al. | 707/692 |

OTHER PUBLICATIONS

International Search Report and Written Opinion received for International Patent Application No. PCT/US2014/056218, mailed on Dec. 18, 2014, 10 pages.
Poremba, et al. "NVMain: An Architectural-Level Main Memory Simulator for Emerging Non-volatile Memories", Symposium, 2012, 6 pages, IEEE.

\* cited by examiner

*Primary Examiner* — Baboucarr Faal
(74) *Attorney, Agent, or Firm* — Thorpe North & Western, LLP (57) ABSTRACT

Apparatus, systems, and methods to manage memory operations are described. In one embodiment, an electronic device comprises a processor and a memory control logic to retrieve a global sequence number from a memory device, receive a read request for data stored in a logical block address in the memory device, retrieve a media sequence number from the logical block address in the memory device, and return a null response in lieu of the data stored in the logical block address when the media sequence number is older than the global sequence number. Other embodiments are also disclosed and claimed.

25 Claims, 10 Drawing Sheets

| LBA | MSN.S | MSN |
|---|---|---|
| 00000001 | 1 | 0101 |
| 00000010 | 1 | 1011 |
| 00000011 | 0 | 0101 |
| 00000100 | 1 | 1011 |

| | | |
|---|---|---|
| 11111110 | 0 | 1110 |
| 11111110 | 0 | 0011 |

GSN GSN.S Refresh Completed Within Series
========================================================
0000 0 0
0001 0 0
...
FFFF 0 0

------Wrap, full partition zero write is needed------

0000 1 0
0001 1 0
...
FFFF 1 0

------Wrap, full partition zero write is needed------

GSN GSN.S Refresh Completed Within Series
========================================================
0000    0    0
0001    0    0
...
FFFF    0    1

----- Wrap, no full partition zero write needed -----

0000 1 0
0001 1 0
...
FFFF 1 1

----- Wrap, no full partition zero write needed -----

MEMORY MANAGEMENT

FIELD

The present disclosure generally relates to the field of electronics. More particularly, some embodiments of the invention generally relate to memory management in electronic devices.

BACKGROUND

Many electronic devices include memory systems may be implemented using local, fast-access memory which is frequently embodied as a volatile memory, e.g., Dynamic Random Access Memory (DRAM) or the like. When the power is reset in the electronic device it causes volatile memory in the device to be reset, typically to zero. Thus, device operating systems are commonly written with the presumption that local, fast-access memory will be reset to zero during a power reset operation.

BRIEF DESCRIPTION OF THE DRAWINGS

The detailed description is provided with reference to the accompanying figures. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Nonvolatile memory systems are being developed to operate at speeds sufficiently fast to be used as local-access volatile memory systems. Unlike volatile memory, nonvolatile memory will not automatically reset to zero during a power reset. Accordingly, techniques to manage local-access volatile memory may find utility in a fast zeroing method, e.g., in memory systems for electronic devices.

Figure 1:
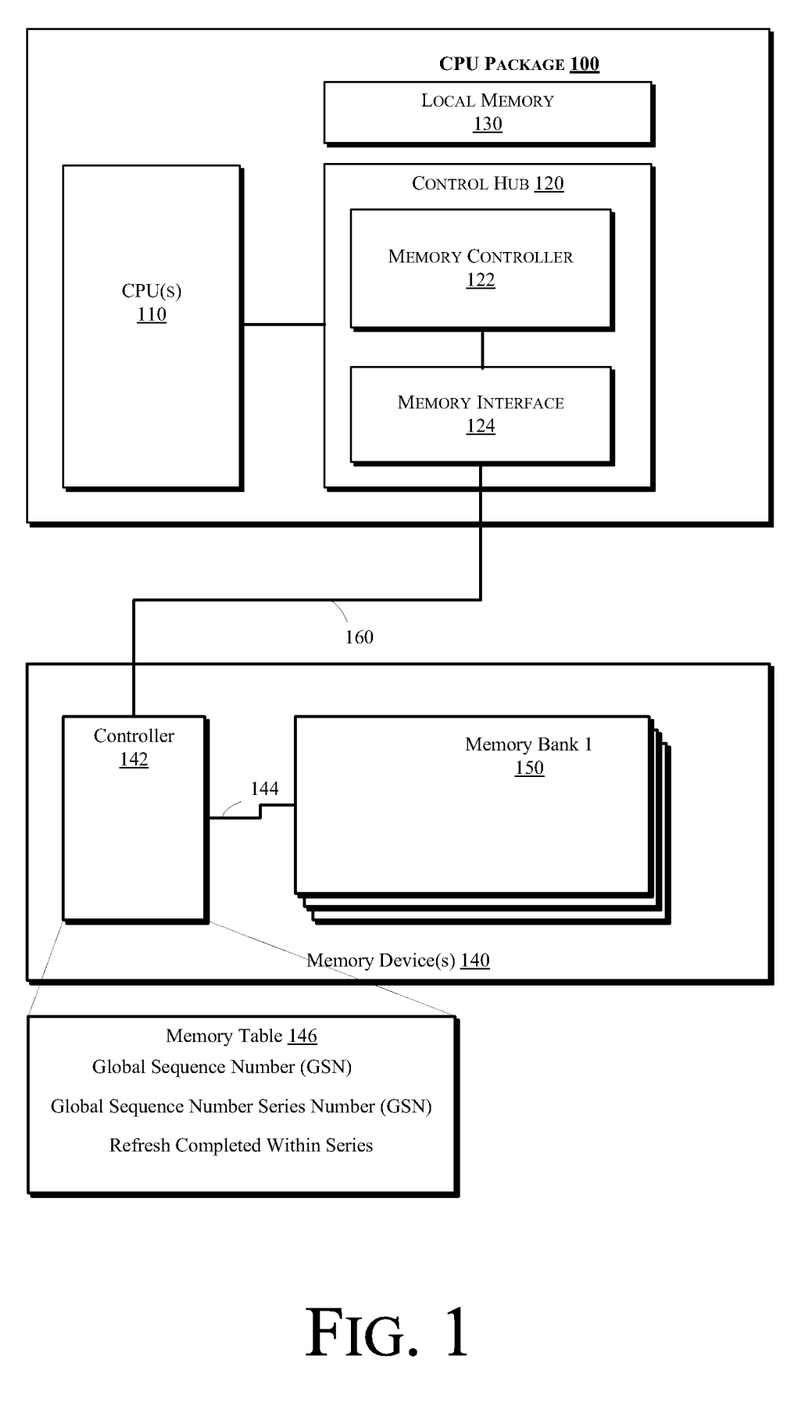
FIG. 1 is a schematic, block diagram illustration of components of apparatus to implement memory management in accordance with various embodiments discussed herein.

FIG. 1 is a schematic, block diagram illustration of components of apparatus to implement memory management in accordance with various embodiments discussed herein. Referring to FIG. 1, in some embodiments a central processing unit (CPU) package 100 which may comprise one or more CPUs 110 coupled to a control hub 120 and a local memory 130. Control hub 120 comprises a memory controller 122 and a memory interface 124.

Memory interface 124 is coupled to one or more remote memory devices 140 by a communication bus 160. Memory device 140 may comprise a controller 142 and one or more memory banks 150. In various embodiments, at least some of the memory banks 150 may be implemented using nonvolatile memory, e.g., phase change memory, NAND (flash) memory, ferroelectric random-access memory (FeTRAM), nanowire-based non-volatile memory, memory that incorporates memristor technology, a static random access memory (SRAM), three dimensional (3D) cross point memory such as phase change memory (PCM), spin-transfer torque memory (STT-RAM) or NAND memory. By way of example, in some embodiments the memory device(s) 140 may comprise one or more direct in-line memory modules (DIMMs) coupled to a memory channel 144 which provides a communication link to controller 142. The specific configuration of the memory bank(s) 150 in the memory device(s) 140 is not critical.

As described above, in some embodiments logic in the memory controller 122 manage memory in memory device(s) 140. More particularly, in some embodiments the memory controller 122 implements operations which enable the nonvolatile memory of memory devices 150 to emulate volatile memory, at least in the sense that read operations to the nonvolatile memory of memory devices 140 will return zeroes following a power reset operation. In brief, the memory controller 122 accomplishes this by determining whether the data in a logical block subject to a read operation was written prior to the most recent power reset operation. If the data in the logical block was written prior to the most recent power reset operation, then the memory controller returns a response to the read operation which includes zeroes in lieu of the data which resides in the logical block. By contrast, if the data in the logical block was written after the most recent power reset operation, then the memory controller returns a response to the read operation which includes the data which resides in the logical block. Thus, the memory controller 122 allows a nonvolatile memory to emulate the power reset attributes of volatile memory.

In some embodiments the memory controller 122 maintains the following parameters in a memory table 146:

A Global Sequence Number (GSN): This is a numeric parameter which is incremented every time the system undergoes a power reset operation. The memory controller stores the GSN in a memory table 146. In some embodiments the GSN may be implemented as an 8 bit binary number such that the GSN may cycle through 256 increments before it wraps back to zero.

A Global Sequence Number Series Number (GSN.S). In some embodiments the GSN may belong to one of a plurality of series. The global sequence number series number indicates the series to which a GSN belongs. In some embodiments the GSN.S may be implemented as the upper most bit of the global sequence number.

A Media Sequence Number (MSN): Whenever a write operation is directed to the memory device(s) 140 the current GSN is written to the media metadata for the section of media to which the write operation is directed and becomes the MSN for that section of media.

Media Sequence Number Series Number (MSN.S)—In some embodiments the MSN may belong to one of a plurality of series. The media sequence number series number indicates the series to which a MSN belongs. In some embodiments the MSN.S may be implemented as the upper most bit of the MSN, copied from the GSN.S when a section of media is written.

Refresh Completed Within Series Flag: This is a flag indicating if a full refresh (e.g., a background process that reads and writes all addresses in the memory device) started and completed within a series. It may be stored on memory device(s) 140.

Figure 2:
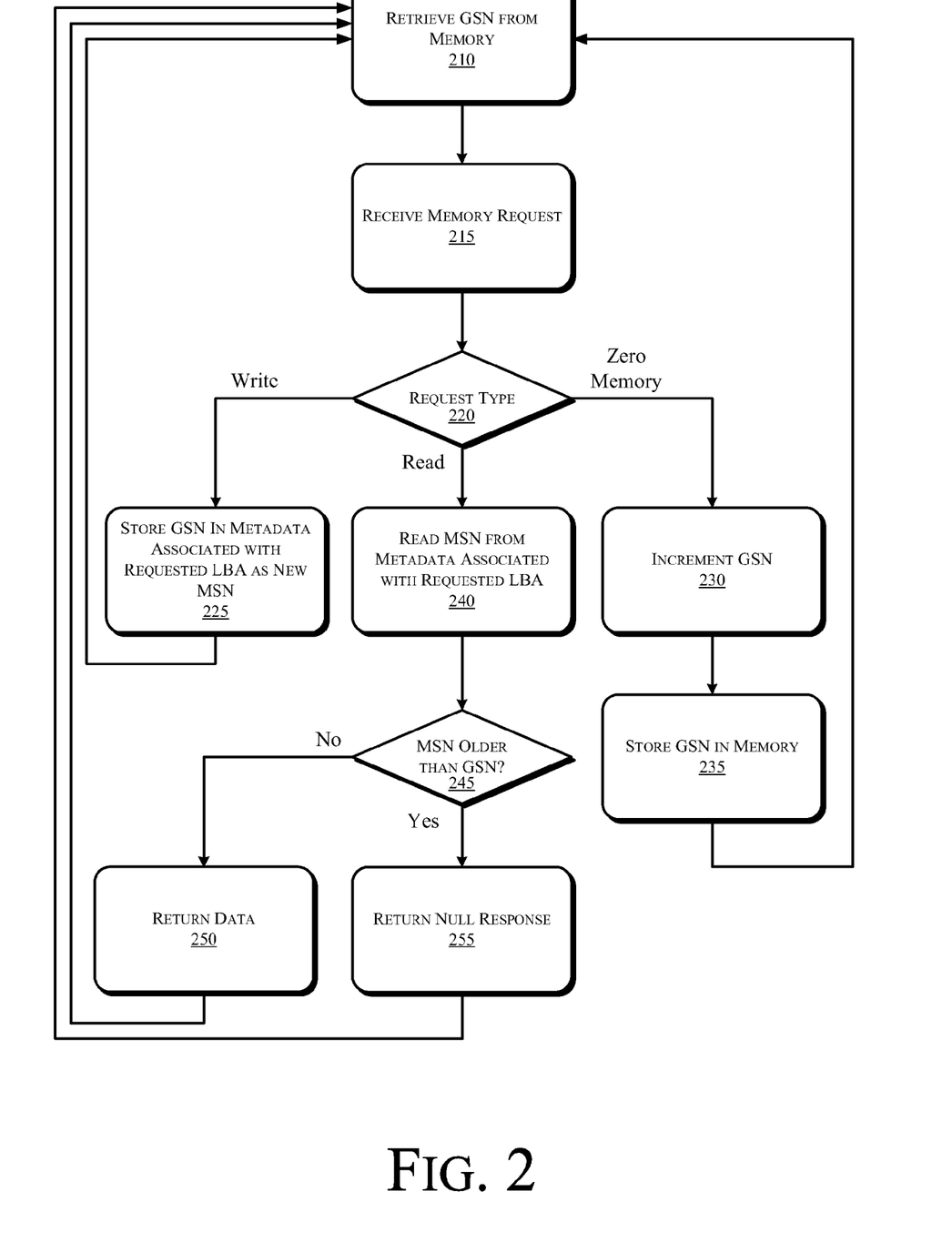
FIGS. 2 and 4 are flowcharts illustrating operations in a method to manage memory in accordance with various embodiments discussed herein.

Operations implemented by memory controller 122 will be described with reference to FIGS. 2 and 4. Referring first to FIG. 2, when a electronic device which incorporates the memory system depicted in FIG. 1 is subjected to a power reset operation the memory controller 122, at operation 210, retrieves the current global sequence number (GSN) from the memory table 146.

Figure 3:
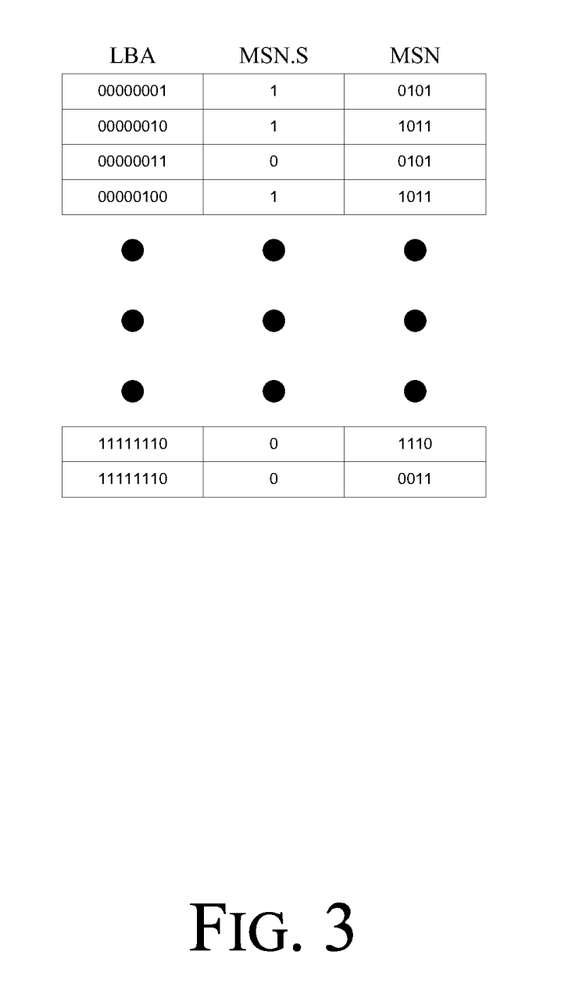
FIG. 3 is a schematic diagram of a metadata table which may be used to implement memory management in accordance with various embodiments discussed herein.

At operation 215 the memory controller 122 receives a memory request from a electronic device which incorporates the memory system depicted in FIG. 1. If, at operation 220, the controller 122 receives a write request then control passes to operation 225 and the controller 122 stores the global sequence number in metadata associated with the requested logical block address as the media sequence number for that logical block address. Referring to FIG. 3, in some embodiments the MSA may be stored in a memory table in association with the logical block address.

Referring back to FIG. 2, if at operation 220 the controller 122 receives a request to write zeroes to the memory in memory device(s) 140, then control passes to operation 230 and the controller 122 increments the global sequence number and at operation 235 the controller 122 stores the global sequence number in the memory device(s) 140. Separately, the controller 122 may implement a background process to write all zeroes to the memory in memory device(s) 140.

By contrast, if at operation 220 the controller 122 receives a request to read data from the memory device(s) 140 then control passes to operation 240 and the controller 122 reads the media sequence number associated with the logical block address identified in the read operation from the table depicted in FIG. 3.

At operation 245 the controller 122 determines whether the media sequence number associated with the logical block address identified in the read operation is older than the global sequence number. In most instances this determination may be made by comparing the media sequence number to the global sequence number. If the media sequence number is less than the global sequence number then the media sequence number is older than the global sequence number.

If, at operation 245 the media sequence number is not older than the global sequence number then control passes to operation 250 and the controller 250 returns the data stored in the logical block address identified in the read operation. By contrast, if at operation 245 the media sequence number is older than the global sequence number then control passes to operation 255 and the controller 122 returns a null response in lieu of the data stored in the logical block address identified in the read request. For example, a null response may comprise all zeroes or a predetermined pattern of bits. Control then passes back to operation 210 and the controller 122 waits for the next memory request from the electronic device.

Thus, the operations depicted in FIG. 2 enable the controller to have nonvolatile memory in memory device(s) 140 that emulate the operation of volatile memory, at least in the sense that read operations directed to memory which has not been written to since the most recent power reset will return zeros rather than the actual data which resides in the logical block address.

Memory limitations dictate that the global sequence number have a finite limit in size. In some embodiments, when the global sequence number hits the finite limit it wraps back to zero. This wrap may result in a situation in which the media sequence number may be higher than the global sequence number even if the logical block address has not received a write operation since the most recent power reset operation. The determination made at operation 245 must accommodate the circumstance in which the global sequence number wraps back to zero. For example, upon detecting a sequence number wrap the media controller may manually write all zeros.

In some embodiments the controller uses the global sequence number series number and the media sequence number series number to accommodate the situation in which global sequence number wraps. The logic to manage this situation is presented in FIG. 4. Referring to FIG. 4, at operation 410 the controller 122 receives a request to increment the global sequence number.

If, at operation 410 the increment does not cause the global sequence number to wrap back to zero then control passes to operation 420 and the global sequence number is incremented in a normal fashion. By contrast, if at operation 415 the global sequence number increment causes the global sequence number to wrap then control passes to operation 425, where the status of the Refresh Completed Within Series flag is checked to determine if the Refresh Completed Within Series flag is set.

In some embodiments the controller 122 implements a separate process which monitors the write operations to the memory device(s) 140 and sets the refresh flag when all logical block addresses in the memory device(s) 140 have been written with data since the most recent power reset operation. Thus, a set refresh flag indicates that all logical block addresses in the memory device(s) 140 have been written with new data since the most recent power reset operation.

Figure 5A:
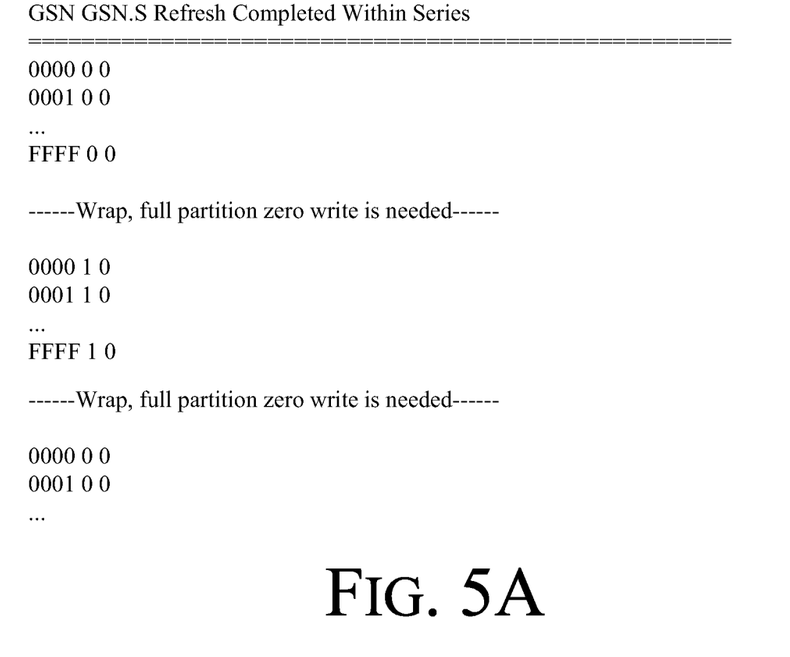
FIGS. 5A and 5B are schematic illustrations of sequence number which may be used in operations in a method implement memory latency management in accordance with various embodiments discussed herein.

If, at operation 425, the refresh flag is not set, then some of the data in the memory device(s) 140 was not rewritten since the most recent power reset operation. In this case control passes to operation 430 and the controller 122 writes zeroes to all addresses in the logical address space of the memory device(s) 140, essentially forcing the nonvolatile memory of memory device(s) 140 to emulate the zeroing function of volatile memory in response to a power reset. This is illustrated in FIG. 5A.

Control then passes to operation 435 and the refresh flag is cleared. At operation 440 the global sequence number is wrapped back to zero, and at operation 445 the series bit is inverted.

Figure 5B:
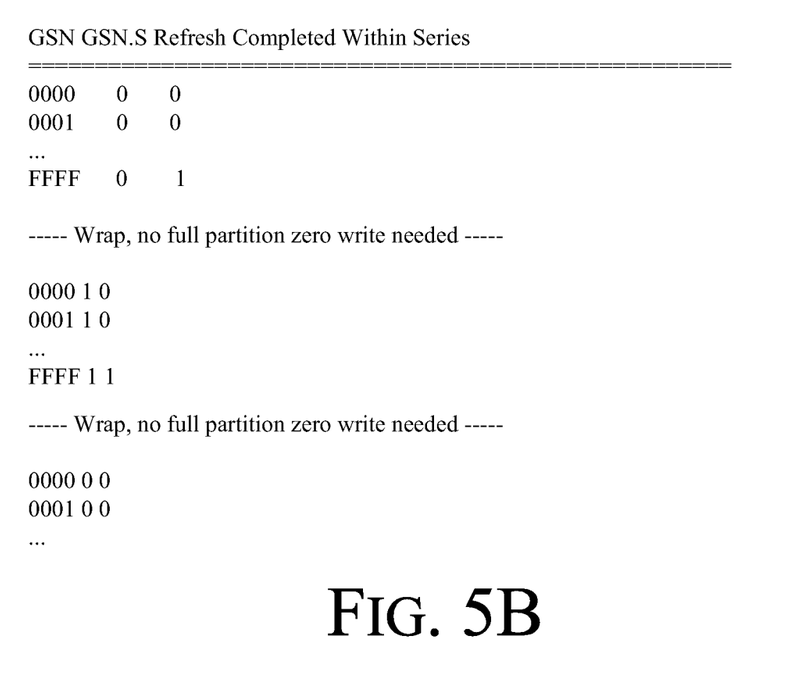

By contrast, if at operation 425 the refresh flag is set then there is no need to write zeroes to the nonvolatile memory in memory device(s) 140 and control can pass directly to operations 435-445. This is illustrated in FIG. 5B.

Figure 4:
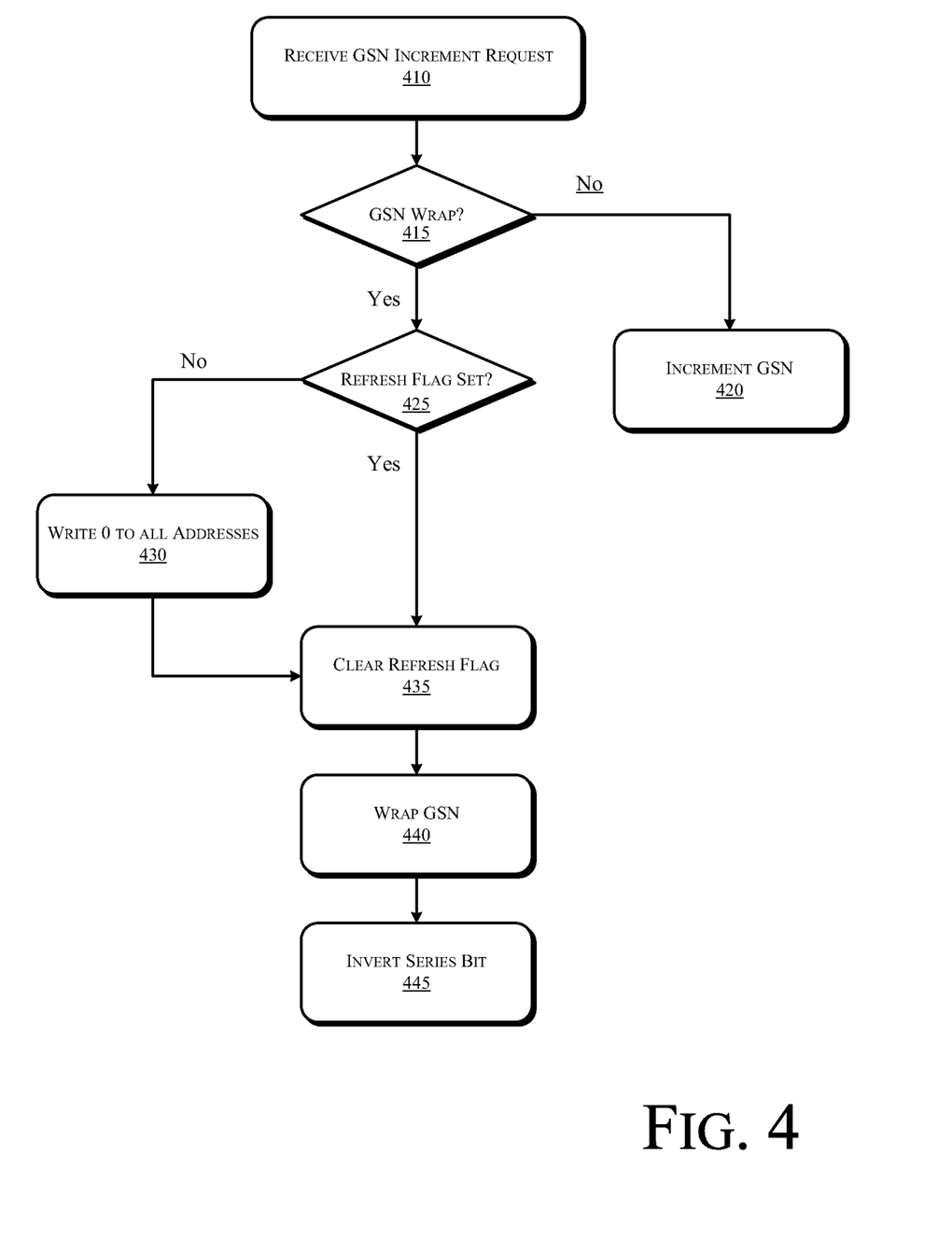

Thus, the operations depicted in FIG. 4 ensure that the global sequence number wrapping back to zero does not result in an erroneous reading of data from logical block addresses in the memory device(s) 140 that have media sequence numbers which are higher than the global sequence number.

Figure 6:
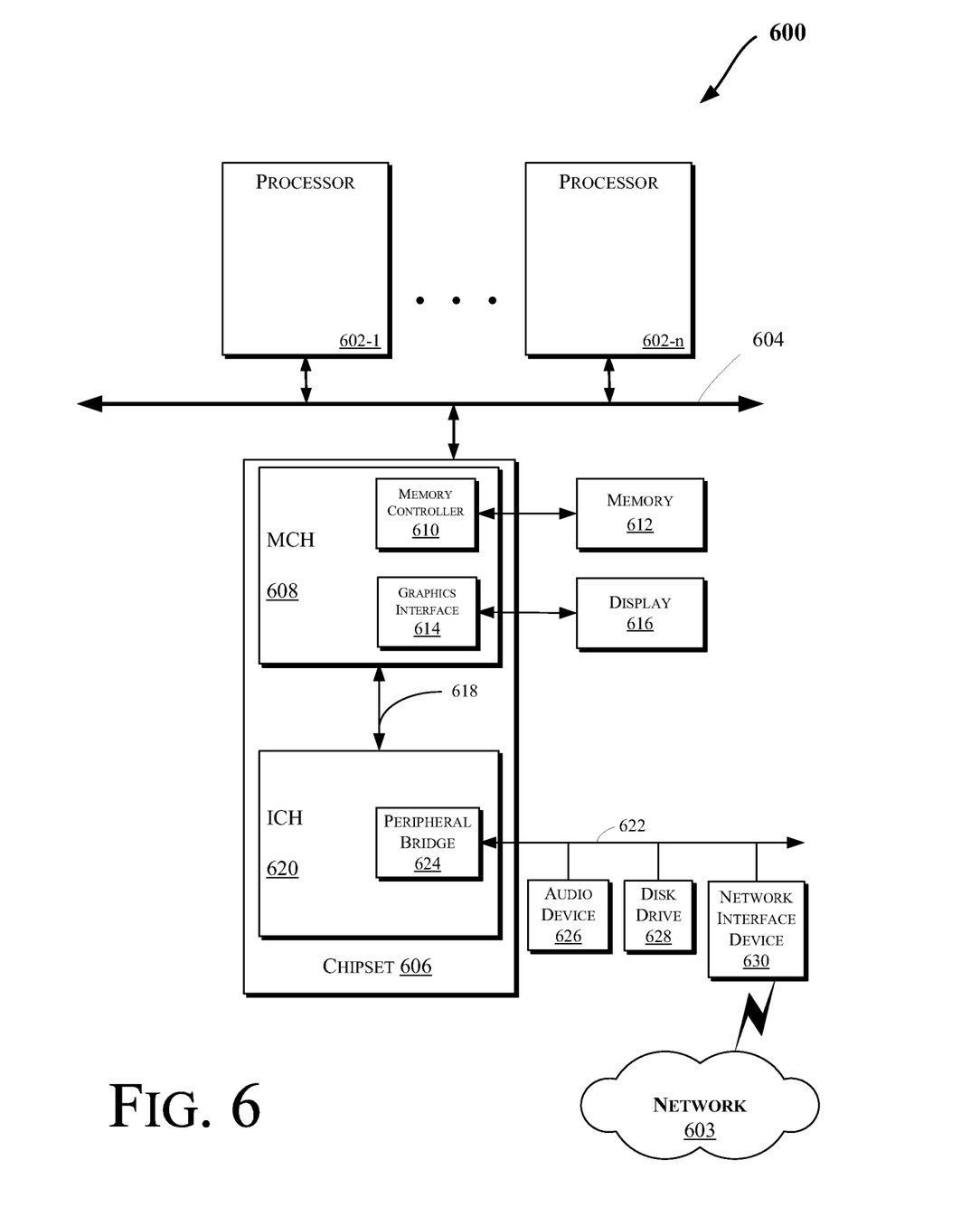
FIGS. 6-10 are schematic, block diagram illustrations of electronic devices which may be adapted to implement memory latency management in accordance with various embodiments discussed herein.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
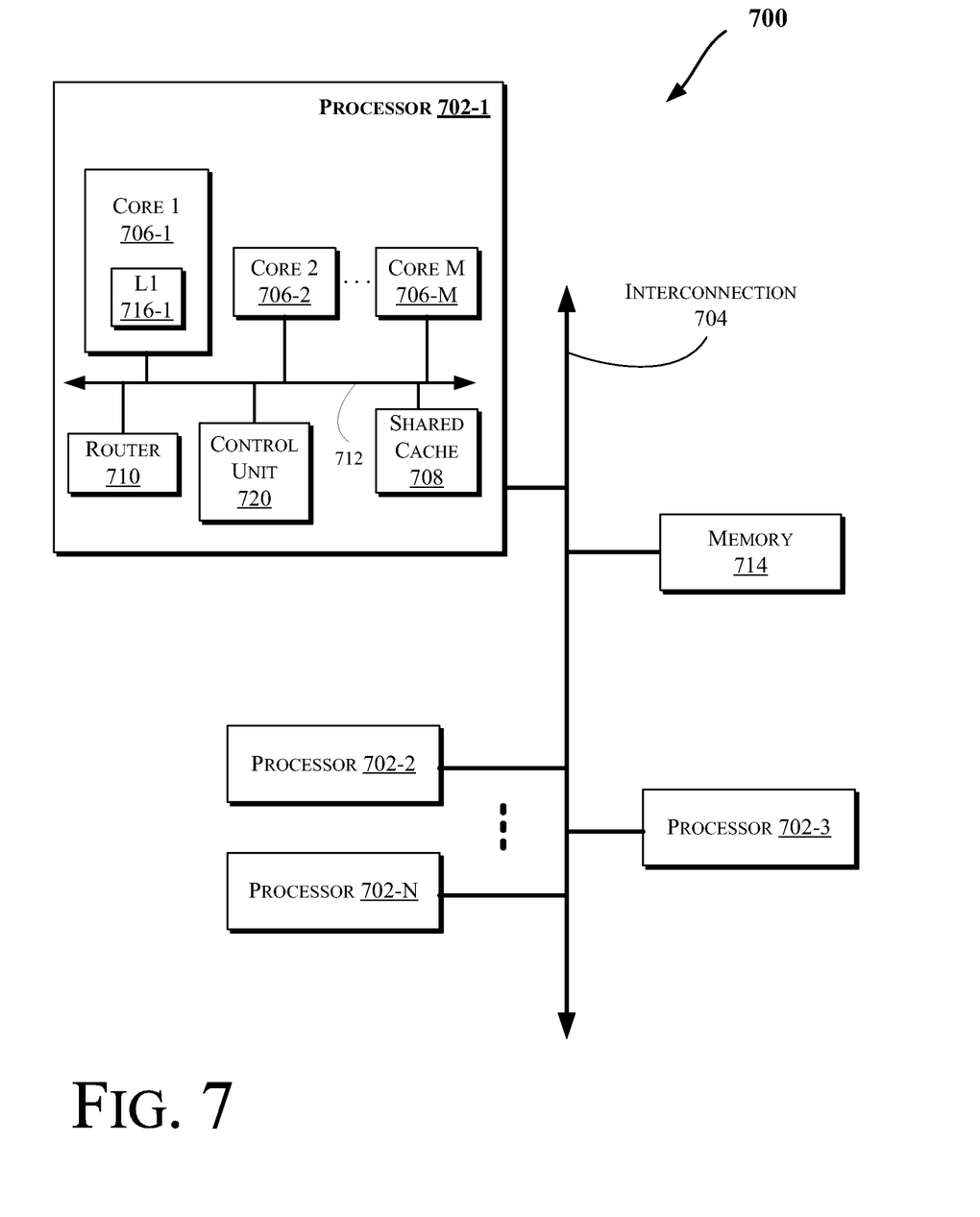

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
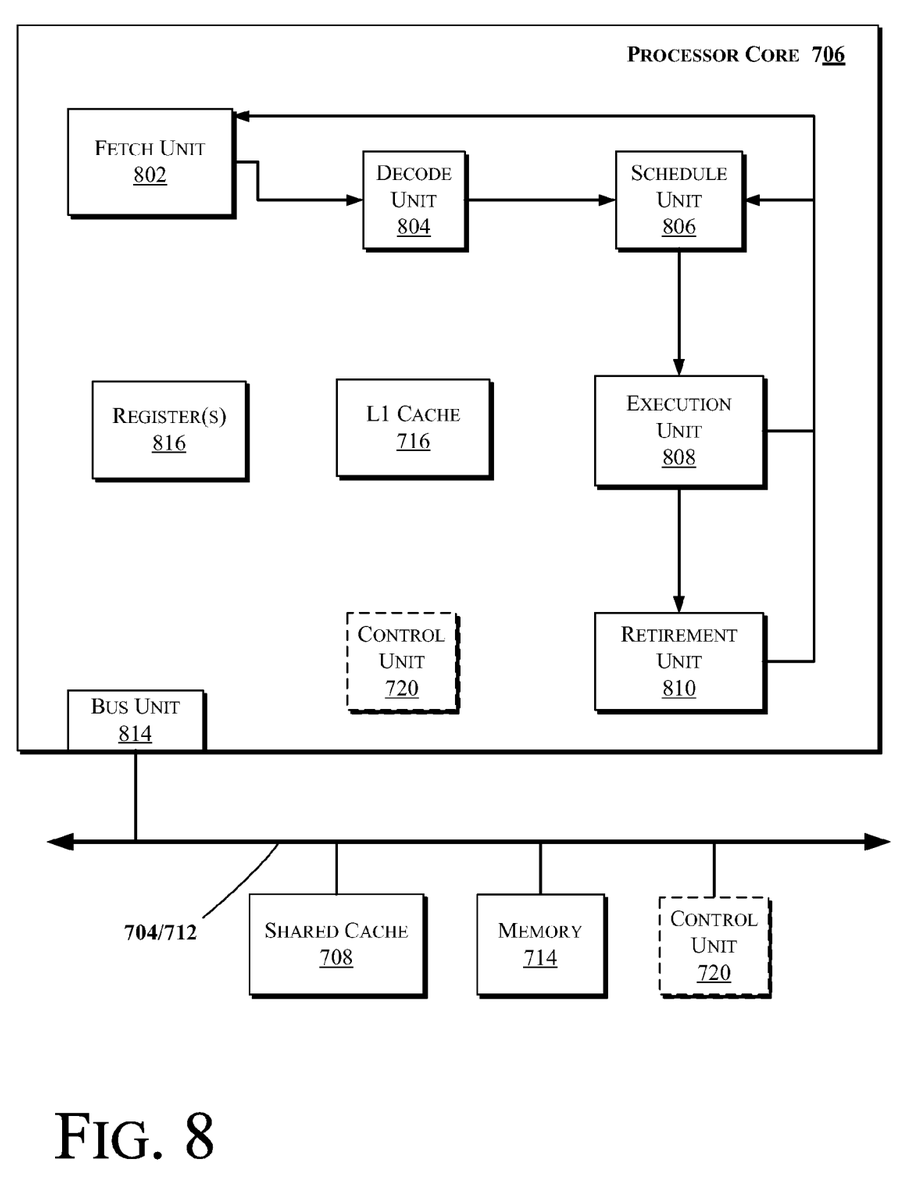

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
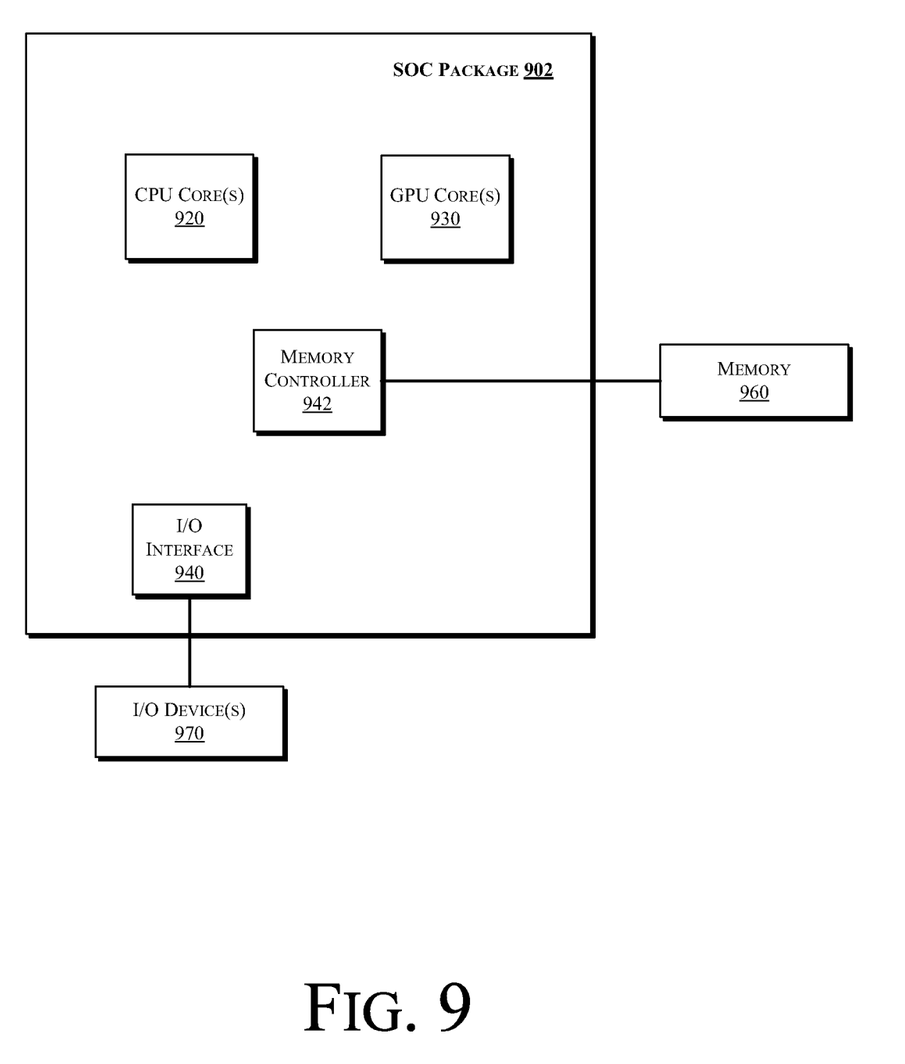

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
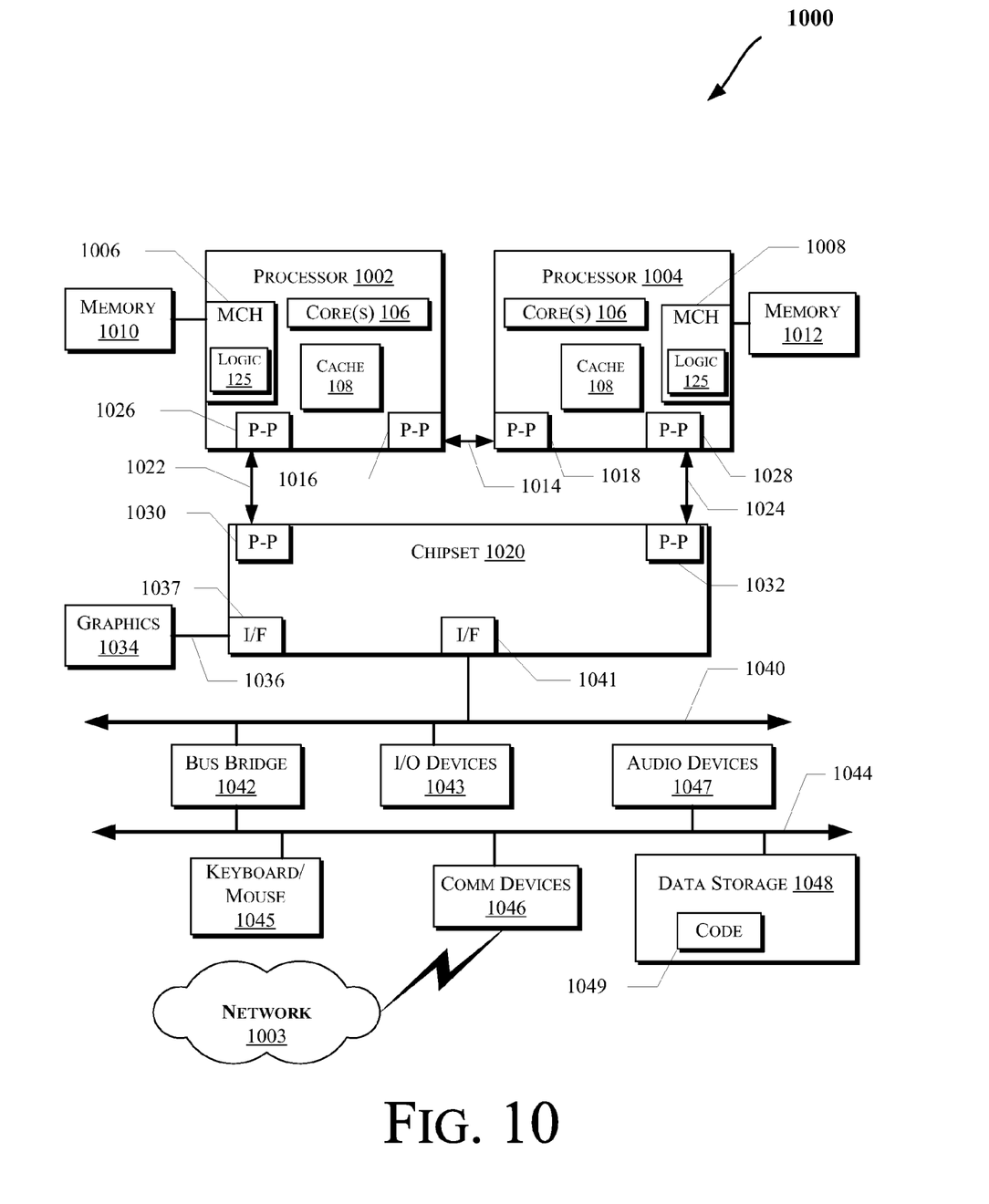

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following examples pertain to further embodiments.

Example 1 is an memory controller comprising logic to retrieve a global sequence number from a memory device, receive a read request for data stored in a logical block address in the memory device, retrieve a media sequence number from the logical block address in the memory device, and return a null response in lieu of the data stored in the logical block address when the media sequence number is older than the global sequence number.

In Example 2, the subject matter of Example 1 can optionally include logic to return a response comprising the data stored in the logical block address in the memory device when the media sequence is not older than the global sequence number.

In Example 3, the subject matter of any one of Examples 1-2 can optionally include logic to receive a write request to write data to a logical block address in the memory device and store the global sequence number into metadata associated with the requested logical block address as a media sequence number.

In Example 4, the subject matter of any one of Examples 1-3 can optionally include logic to receive a zero memory request, and in response to the zero memory command, increment the global sequence number, and store the global sequence number in the memory device.

In Example 5, the subject matter of any one of Examples 1-4 can optionally include an arrangement in which the global sequence number comprises a global sequence series number which identifies a series to which the global sequence number belongs, and the media sequence number comprises a media sequence series number which identifies a series to which the media sequence number belongs.

In Example 6, the subject matter of any one of Examples 1-5 can optionally include logic to return a null response in lieu of the data stored in the logical block address when the media sequence series number is equal to the global sequence serial number, and the media sequence number is less than the global sequence number.

In Example 7, the subject matter of any one of Examples 1-6 can optionally include logic to return a response comprising the data stored in the logical block address in the memory device when the media sequence series number is equal to the global sequence serial number, and the media sequence number is less than the global sequence number.

In Example 8, the subject matter of any one of Examples 1-7 can optionally include logic to return a null response in lieu of the data stored in the logical block address when the media sequence serial number is not equal to the global sequence serial number.

Example 9 is an electronic device comprising a processor and memory control logic to retrieve a global sequence number from a memory device, receive a read request for data stored in a logical block address in the memory device, retrieve a media sequence number from the logical block address in the memory device, and return a null response in lieu of the data stored in the logical block address when the media sequence number is older than the global sequence number.

In Example 10, the subject matter of Example 9 can optionally include logic to receive, from a device, a request for the data, and generate, in response to the request from the device, a request for the data from the remote memory device.

In Example 11, the subject matter of any one of Examples 9-10 can optionally include logic to return a response comprising the data stored in the logical block address in the memory device when the media sequence is not older than the global sequence number.

In Example 12, the subject matter of any one of Examples 9-11 can optionally include logic to receive a write request to write data to a logical block address in the memory device, and store the global sequence number into metadata associated with the requested logical block address as a media sequence number.

In Example 13, the subject matter of any one of Examples 9-12 can optionally include logic to receive a zero memory request, and in response to the zero memory command, increment the global sequence number, and store the global sequence number in the memory device.

In Example 14, the subject matter of any one of Examples 9-12 can optionally include an arrangement in which the global sequence number comprises a global sequence series number which identifies a series to which the global sequence number belongs, and the media sequence number comprises a media sequence series number which identifies a series to which the media sequence number belongs.

In Example 15, the subject matter of any one of Examples 9-14 can optionally include logic to return a null response in lieu of the data stored in the logical block address when the media sequence series number is equal to the global sequence serial number, and the media sequence number is less than the global sequence number.

In Example 16, the subject matter of any one of Examples 9-15 can optionally include logic to return a response comprising the data stored in the logical block address in the memory device when the media sequence series number is equal to the global sequence serial number, and the media sequence number is less than the global sequence number.

In Example 17, the subject matter of any one of Examples 9-16 can optionally include logic to return a null response in lieu of the data stored in the logical block address when the media sequence serial number is not equal to the global sequence serial number.

Example 18 is a computer program product comprising logic instructions stored in a non-transitory computer readable medium which, when executed by a processor, configure the processor to retrieve a global sequence number from a memory device, receive a read request for data stored in a logical block address in the memory device, retrieve a media sequence number from the logical block address in the memory device, and return a null response in lieu of the data stored in the logical block address when the media sequence number is older than the global sequence number.

In Example 19, the subject matter of Example 18 can optionally include logic to return a response comprising the data stored in the logical block address in the memory device when the media sequence is not older than the global sequence number.

In Example 20 the subject matter of any one of Examples 18-19 can optionally include logic to receive a write request to write data to a logical block address in the memory device and store the global sequence number into metadata associated with the requested logical block address as a media sequence number.

In Example 21, the subject matter of any one of Examples 18-20 can optionally include logic to receive a zero memory request, and in response to the zero memory command, increment the global sequence number, and store the global sequence number in the memory device.

In Example 22, the subject matter of any one of Examples 18-21 can optionally include an arrangement in which the global sequence number comprises a global sequence series number which identifies a series to which the global sequence number belongs, and the media sequence number comprises a media sequence series number which identifies a series to which the media sequence number belongs.

In Example 23, the subject matter of any one of Examples 18-22 can optionally include logic to return a null response in lieu of the data stored in the logical block address when the media sequence series number is equal to the global sequence serial number, and the media sequence number is less than the global sequence number.

In Example 24, the subject matter of any one of Examples 18-23 can optionally include logic to return a response comprising the data stored in the logical block address in the memory device when the media sequence series number is equal to the global sequence serial number, and the media sequence number is less than the global sequence number.

In Example 25, the subject matter of any one of Examples 18-24 can optionally include logic to return a null response in lieu of the data stored in the logical block address when the media sequence serial number is not equal to the global sequence serial number.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A memory controller comprising logic, at least partially including hardware logic, to:
retrieve a global sequence number from a memory device;
receive a read request for data stored in a logical block address in the memory device;
retrieve a media sequence number from the logical block address in the memory device; and
return a null response in lieu of the data stored in the logical block address when the media sequence number is older than the global sequence number.

2. The memory controller of claim 1, further comprising logic, at least partially including hardware logic, to:
return a response comprising the data stored in the logical block address in the memory device when the media sequence is not older than the global sequence number.

3. The memory controller of claim 1, further comprising logic, at least partially including hardware logic, to:
receive a write request to write data to a logical block address in the memory device; and
store the global sequence number into metadata associated with the requested logical block address as a media sequence number.

4. The memory controller of claim 1, further comprising logic, at least partially including hardware logic, to:
receive a zero memory request, and in response to the zero memory request:
increment the global sequence number; and
store the global sequence number in the memory device.

5. The memory controller of claim 1, wherein:
the global sequence number comprises a global sequence series number which identifies a series to which the global sequence number belongs; and
the media sequence number comprises a media sequence series number which identifies a series to which the media sequence number belongs.

6. The memory controller of claim 5, further comprising logic, at least partially including hardware logic, to:
return a null response in lieu of the data stored in the logical block address when:
the media sequence series number is equal to the global sequence serial number; and
the media sequence number is less than the global sequence number.

7. The memory controller of claim 5, further comprising logic, at least partially including hardware logic, to:
return a response comprising the data stored in the logical block address in the memory device when:
the media sequence series number is equal to the global sequence serial number; and
the media sequence number is less than the global sequence number.

8. The memory controller of claim 5, further comprising logic, at least partially including hardware logic, to:
return a null response in lieu of the data stored in the logical block address when the media sequence serial number is not equal to the global sequence serial number.

9. An electronic device comprising:
a processor; and
a memory control logic to:
retrieve a global sequence number from a memory device;
receive a read request for data stored in a logical block address in the memory device;
retrieve a media sequence number from the logical block address in the memory device; and
return a null response in lieu of the data stored in the logical block address when the media sequence number is older than the global sequence number.

10. The electronic device of claim 9, wherein the memory controller further comprises logic to:
receive, from a device, a request for the data; and
generate, in response to the request from the device, a request for the data from the memory device.

11. The electronic device of claim 10, wherein the memory controller further comprises logic to:

return a response comprising the data stored in the logical block address in the memory device when the media sequence is not older than the global sequence number.

12. The electronic device of claim 9, wherein the memory controller further comprises logic to:
receive a write request to write data to a logical block address in the memory device; and
store the global sequence number into metadata associated with the requested logical block address as a media sequence number.

13. The electronic device of claim 9, wherein the memory controller further comprises logic to:
receive a zero memory request, and in response to the zero memory request:
increment the global sequence number; and
store the global sequence number in the memory device.

14. The electronic device of claim 9, wherein:
the global sequence number comprises a global sequence series number which identifies a series to which the global sequence number belongs; and
the media sequence number comprises a media sequence series number which identifies a series to which the media sequence number belongs.

15. The electronic device of claim 14, wherein the memory controller further comprises logic to:
return a null response in lieu of the data stored in the logical block address when:
the media sequence serial number is equal to the global sequence serial number; and
the media sequence number is less than the global sequence number.

16. The electronic device of claim 14, wherein the memory controller further comprises logic to:
return a response comprising the data stored in the logical block address in the memory device when:
the media sequence serial number is equal to the global sequence serial number; and
the media sequence number is less than the global sequence number.

17. The electronic device of claim 14, wherein the memory controller further comprises logic to:
return a null response in lieu of the data stored in the logical block address when the media sequence serial number is not equal to the global sequence serial number.

18. A computer program product comprising logic instructions stored in a non-transitory computer readable medium which, when executed by a processor, configure the processor to:
retrieve a global sequence number from a memory device;
receive a read request for data stored in a logical block address in the memory device;
retrieve a media sequence number from the logical block address in the memory device; and
return a null response in lieu of the data stored in the logical block address when the media sequence number is older than the global sequence number.

19. The computer program product of claim 18, further comprising logic instructions stored in a non-transitory computer readable medium which, when executed by a processor, configure the processor to:
return a response comprising the data stored in the logical block address in the memory device when the media sequence is not older than the global sequence number.

20. The computer program product of claim 18, further comprising logic instructions stored in a non-transitory computer readable medium which, when executed by a processor, configure the processor to:
receive a write request to write data to a logical block address in the memory device; and
store the global sequence number into metadata associated with the requested logical block address as a media sequence number.

21. The computer program product of claim 18, further comprising logic instructions stored in a non-transitory computer readable medium which, when executed by a processor, configure the processor to:
receive a zero memory request, and in response to the zero memory request:
increment the global sequence number; and
store the global sequence number in the memory device.

22. The computer program product of claim 18, wherein:
the global sequence number comprises a global sequence series number which identifies a series to which the global sequence number belongs; and
the media sequence number comprises a media sequence series number which identifies a series to which the media sequence number belongs.

23. The computer program product of claim 22, further comprising logic instructions stored in a non-transitory computer readable medium which, when executed by a processor, configure the processor to:
return a null response in lieu of the data stored in the logical block address when:
the media sequence serial number is equal to the global sequence serial number; and
the media sequence number is less than the global sequence number.

24. The computer program product of claim 22, further comprising logic instructions stored in a non-transitory computer readable medium which, when executed by a processor, configure the processor to:
return a response comprising the data stored in the logical block address in the memory device when:
the media sequence serial number is equal to the global sequence serial number; and
the media sequence number is less than the global sequence number.

25. The computer program product of claim 22, further comprising logic instructions stored in a non-transitory computer readable medium which, when executed by a processor, configure the processor to:
return a null response in lieu of the data stored in the logical block address when the media sequence serial number is not equal to the global sequence serial number.

* * * * *